Patented Feb. 2, 1954

2,668,182

UNITED STATES PATENT OFFICE 2,668,182

POLYUNSATURATED FLUOROOLEFINS

William T. Miller, Ithaca, N. Y.

No Drawing. Application July 13, 1950,
Serial No. 173,689

26 Claims. (Cl. 260—653)

This application is a continuation-in-part of my prior and copending application Serial No. 601,387, filed June 25, 1945.

This invention relates to a new class of compounds, the poly-unsaturated fluoroolefins. In one aspect the invention relates to fluorobutadienes, and in particular to perhalofluorobutadienes containing a relatively high proportion of fluorine.

In recent years there has been considerable interest in fluorocarbons, especially in the perfluorocarbons, in view of their high degree of inertness to many reactive substances. However, prior to the present invention, only a small number of these compounds were known.

One object of the present invention is to advance the chemistry of the fluorocarbons, particularly the polyfluorinated perhalo compounds. The prefix "poly" as used in this specification refers to the number of double bonds or of fluorine atoms in the molecule and not to a polymerized compound except where the term "polymer" is used.

Another object of the invention is to provide polyunsaturated fluorocarbons and fluorochlorocarbons which may be employed in syntheses or for polymerization to produce materials for various uses such as for heat exchange liquids, lubricants and plastics.

A further object of the invention is to make possible the production of fluororubbers by providing fluoroolefins which may be polymerized to produce them.

Still another object of the invention is to provide methods of making such unsaturated fluorocarbons.

A specific object of the invention is to provide new, unsaturated polyfluoroperhalocarbon compounds of relatively low molecular weight which may be employed in syntheses to prepare still other new and useful polyfluoro compounds.

Another specific object of the invention is to prepare unsaturated perfluorocarbons, the prefix "per" meaning that all of the substituents of the carbon atoms are fluorine.

The new compounds of the present invention are haloolefins having at least three base carbon atoms per molecule, more particularly from 4 to 12 carbon atoms, and having at least two double bonds between base carbon atoms and at least one fluorine atom attached to a base carbon atom. The haloolefins of this invention may contain other substantially stable organic functional groupings made up of carbon and elements other than hydrogen, such as nitrogen and oxygen, attached to the base carbon atoms. Both acyclic and alicyclic olefinic compounds are included within the scope of this invention. Preferably, these new compounds are of the diene class, containing two double bonds between base carbon atoms.

The preferred new compounds of the present invention have the general conjugated formula,

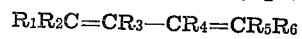

$$R_1R_2C=CR_3-CR_4=CR_5R_6$$

in which at least one and preferably more than one of the R substituents is fluorine, the remaining R substituents being halogen or other stable functional groups of which there may be mentioned, for example, the nitro and cyanide groups. A very useful sub-class of this group of compounds are the fluorobutadienes of four carbon atoms which are substituted by more than one fluorine atom and which consist only of carbon and halogen and more particularly which consist only of carbon and fluorine or of carbon, fluorine and chlorine. A preferred compound of this invention is hexafluorobutadiene-1,3, or the perfluorinated conjugated butadiene. Such butadienes are useful for polymerization or other synthetic reactions. Another valuable sub-class are the butadienes substituted by at least one fluorine atom and also by at least one radical selected from the group of perfluoroalkyl, perfluoroaryl, perfluoroacyl, perfluoroether, perfluorochloralkyl, perfluorochloroaryl and perfluorochloroacyl and perfluorochloroether radicals; the preferred members of this sub-class are those which consist only of carbon and halogen and more particularly which consist only of carbon and fluorine or of carbon, fluorine and chlorine, especially those in which said radical is —CF$_3$ or —C$_2$F$_5$.

According to the present invention, fluorobutadienes may be made by carrying out the following reaction steps:

$$2RR'C=CR''X \xrightarrow{\text{heat}} RR'C=CR''-CR''X-CRR'X$$

in which the R substituents are selected from the group of halogen, perfluoroalkyl, perfluoroaryl, perfluorochloroalkyl and perfluorochloroaryl radicals, at least one R substituent being fluorine, and X is a halogen other than fluorine and is preferably chlorine. The R substituents may be the same or different. The preferred class of starting olefins for this synthesis consists of perfluorochloroethylenes in which all the R substituents are halogen and in which at least one R is fluorine. The dimer thus produced is then treated with zinc in the presence of a solvent to remove the X substituents and introduce a double bond between the 3,4 position carbon atoms. The mechanism is shown by the equation,

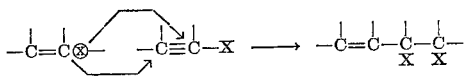

Apparently, the mechanism of the dimerization reaction shown above is such that in one of the monomer molecules the X atom becomes mobile, the carbon atom to which it is attached attaches to the X-bearing carbon atom of the other monomer molecule, and the mobile X atom attaches to the other carbon atom of the latter monomer molecule. In this manner, as shown above, a double bond is formed between the 1,2 position carbon atoms and the X substituents are connected to the 3,4 position carbon atoms. This combination dimerization and rearrangement reaction for producing the open-chain butenes is effected by heat treating the monomer, suitably within the temperature range of about 190 to 800° C., but preferably within the range of about 200 to 750° C. With trifluorochloroethylene as the starting material, this may be accomplished advantageously by passing it through a hot tube with a contact time of less than a minute, and, preferably, less than 10 seconds, at a temperature between 400 and 800° C. and preferably between 450 and 700° C. with or without a catalyst, such as charcoal or charcoal impregnated with a metal halide catalyst, such as iron or aluminum chloride or fluorides. With certain other olefins, such as CFCl=CFCl, the reaction may be brought about at a lower temperature and may be satisfactorily carried out by heating in a bomb at from 190 to 300° C. at autogeneous pressure.

Another synthesis, effective for preparing fluorobutadienes consisting only of carbon and fluorine or of carbon, fluorine and chlorine, described in my copending application Serial No. 200,657, filed December 13, 1950, comprises the following reaction steps:

2CClY=CClY′+F₂→
FClYC—CClY′—CClY′—CYClF

In the above equation the Y substituents may be fluorine or chlorine or a perfluoroalkyl, perfluoroaryl, perfluorochloroalkyl or perfluorochloroaryl group and may be the same or different. When they are different, three products are possible, depending upon orientation, and may be classed as head to head, head to tail, and tail to tail. This step is preferably carried out at 0° C. or below. However, in certain cases higher temperatures may be used. The mechanism of the reaction is such that fluorine reacts with a monomer molecule to form a radical and a fluorine atom. The fluorine atom formed in this way reacts with a second monomer molecule to form a second radical. The two radicals combine to form the dimer product, according to the following reactions:

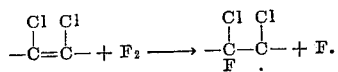

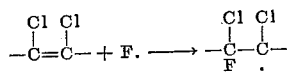

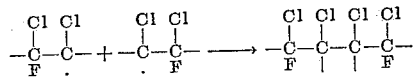

In the above formulas the dots represent unshared electrons. In this way a saturated compound is formed so that further polymerization is prevented and a compound is obtained which has the structure necessary for the production of a fluorobutadiene. Then this intermediate is dechlorinated by treatment with zinc in the presence of a solvent, thereby producing the characteristic diene structure. In carrying out dehalogenation by means of zinc, the solvents that may be used include the lower aliphatic alcohols such as methanol or ethanol, the carbitols, the cellosolves, dioxane, glycerine and mixtures of dioxane and glycerine. Water or aqueous mixtures may also be utilized but anhydrous solvents are preferred. The process is effectively carried out at moderate temperatures and is suitably carried out under reflux conditions. Other metals such as magnesium or copper may be used in place of zinc, but zinc or metal combinations containing zinc are preferred. Zinc chloride may be used as a promoter in order to avoid inhibition periods in dechlorinations.

According to one of its aspects, the present invention comprises providing the 1,2,3,4-tetrahalogen addition product, the butane, of the desired butadiene and then removing the halogen which must be other than fluorine, from the compound to produce the butadiene.

The present invention is illustrated by the following examples.

*Example I*

About 94 gs. of trifluoromonochloroethylene was passed through a Pyrex tube heated at 550° C. with a contact time of the order of seconds at atmospheric pressure. The reaction products were distilled to yield 60 gs. of fraction I boiling from −24° C. to −22° C., uncorrected, and 20.5 gs. of fraction II boiling from 55° C. to 62° C., uncorrected (a major portion boiling from 59.0 to 61° C.). Fraction II consisted essentially of C₄F₆Cl₂, molecular weight 234 (found), 233 (theoretical) of which two isomers having relatively close boiling points were present,

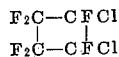

1,2-dichlorohexafluorocyclobutane, and

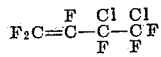

3,4-dichlorohexafluorobutene-1. About 20 gs. of fraction II was sealed in a Pyrex glass tube with an excess of liquid chlorine. The tube was allowed to warm to room temperature and was then exposed to the light of two 200-watt lamps for 24 hours. It was then opened, chlorine was boiled off, the products were washed with a solution of NaHSO₃, dried and distilled. Distillation yielded 7 gs. of fraction III, B. P. 60–61° C., which consisted essentially of unchanged 1,2-dichlorohexafluorocyclobutane and 4 gs. of fraction IV, B. P. 132–133° C., $n_D^{22}$, 1.3852, which consisted essentially of 1,2,3,4-tetrachlorohexafluorobutane. The latter compound resulted from the addition of two atoms of chlorine to the unsaturated C₄F₆Cl₂ isomer, 3,4-dichlorohexafluorobutene-1.

A larger amount of 1,2,3,4-tetrachlorohexafluorobutane prepared in the same manner was dechlorinated at substantially atmospheric pressure by treatment with zinc. The apparatus used was a 500 ccs. 3-necked flask immersed in an oil bath and fitted with a separatory funnel, a stirrer, and a water-cooled reflux condenser connected to a trap cooled by a mixture of Dry Ice and acetone. About 85 gs. of 93% zinc dust and 350 ccs. of butyl Carbitol were placed in the flask. About 130 gs. of tetrachloroperfluorobutane was added dropwise, the mixture was stirred and the bath was maintained at a temperature of 145° C. Fumes immediately appeared over the swirling mass in the reaction vessel and condensate began to collect in the cold trap. About 60 gs. of condensate collected. At the end of the reaction a solution of ZnCl₂ remained in the flask. The condensate was distilled and yielded 50.9 gs. of a product, B. P. 7.4–7.6° C., uncorrected, consisting essentially of

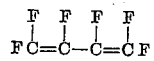

hexafluorobutadiene-1,3, molecular weight 160 (found), 162 (theoretical). On reacting this product with molten sodium, leaching the reaction mixture with water and adding silver nitrate solution, no precipitate was obtained, indicating the absence of chlorine. Silver fluoride is very soluble in water.

The product, B. P. 7.4–7.6° C., was chlorinated by treatment with chlorine gas at atmospheric pressure in the presence of light. The chlorinated product had the following characteristics: B. P. 132.5° C.; $n_D^{20.5}$, 1.3850 and consisted essentially of 1,2,3,4-tetrachlorohexafluorobutane.

Treatment of the mixture of isomers having the molecular formula $C_4F_6Cl_2$ with chlorine as described above provides one method of separating the saturated, cyclic compound from the desired unsaturated, open-chain compound capable of yielding a perhalofluorobutadiene since chlorination yields the saturated isomer unchanged and the chlorine addition product of the unsaturated isomer which has a much higher boiling point and is readily separable by distillation. Alternatively, the mixture of isomers of formula $C_4F_6Cl_2$ may be dechlorinated directly employing the dechlorination procedure described above to yield a mixture of

hexafluorocyclobutene, and

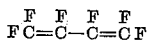

hexafluorobutadiene-1,3. Hexafluorobutadiene-1,3 can be partially separated from this mixture by cooling to the temperature of Dry Ice. At this temperature hexafluorocyclobutene is obtained as a solid, hexafluorobutadiene-1,3 remaining in the liquid fraction which can be poured off. The mixture of isomers of the formula, $C_4F_6Cl_2$, may also be separated by fractional distillation through an efficient column of about thirty plates or more. This is a preferred method for handling large quantities of material.

Example 2

Trifluoromonochloroethylene was passed through a tube at a temperature of 550° C. to 560° C. and a fraction boiling from 55° C. to 67° C. which was a crude mixture of the isomers of the formula $C_4F_6Cl_2$, was separated from the hot tube reaction products by distillation. This fraction was brominated by mixing it with liquid bromine at room temperature in the presence of light. After distilling off the unreacted $C_4F_6Cl_2$ isomer, 1,2-dichlorohexafluorocyclobutane, the dibromide, $C_4F_6Cl_2Br_2$, remained. This material was dehalogenated by treatment with zinc. The apparatus used was a 3-necked flask fitted with a separatory funnel, a stirrer and a fractionation column connected to a water cooled condenser. About 1,000 ccs. of dry dioxane and 200 gs. of 93% zinc dust were introduced into the reaction flask and heated to the boiling point of dioxane. Then 525 gs. of $C_4F_6Cl_2Br_2$ was added with stirring and the flask heated with a flame. The reaction products yielded 41.5 gs. of crude hexafluorobutadiene-1,3 and 242.0 gs. of crude 3,4-dichlorohexafluorobutene-1. On redistillation of the latter material to purify it, a large fraction had the following characteristics: B. P. 64.5–65° C. at 740 mm. Hg; $n_D^{20}$, 1.3412. By further treatment this material may be dechlorinated to yield hexafluorobutadiene-1,3. Dioxane is a relatively mild dechlorinating solvent as compared with hydroxylated solvents which are more energetic, and when it is used relatively long periods of treatment and higher temperatures are needed to effect complete dechlorination.

This example illustrates a further method of separating from a mixture of the close boiling isomers of the formula $C_4F_6Cl_2$, the particular isomer 3,4-dichlorohexafluorobutene-1, which is an intermediate for the preparation of hexafluorobutadiene-1,3.

Example 3

About 1263 gs. of symmetrical dichlorodifluoroethylene, $CClF=CClF$, was reacted with fluorine. The reaction was carried out in a stainless steel container cooled by a mixture of Dry Ice and acetone. The olefin was added to the cooled container under a nitrogen atmosphere and fluorine was passed into the vessel for about 26 hours at a rate corresponding to a current of 9 to 10 amperes through the fluorine electrolysis cell. About 620 gs. of $C_4Cl_4F_6$, 1,2,3,4-tetrachlorohexafluorobutane, was obtained by distillation of the reaction mixture.

A sample of $C_4Cl_4F_6$, B. P. 60–75° C. at 75 mm. Hg, was dechlorinated by treatment with zinc. The apparatus used was similar to that described in Example 2. The fractionating column led to a Dry Ice cooled receiver. About 102 gs. of the compound was heated with stirring in the presence of about 250 ccs. of butyl Carbitol and 60 gs. of zinc dust. The temperature of the oil bath utilized for heating was about 200° C. The column temperature was between 15° C. and 20° C. The products were fractionally distilled and a fraction, B. P. 7–11° C., mainly hexafluorobutadiene-1,3, was recovered in substantial yield.

This example illustrates the preparation of a perfluorobutadiene by carrying out the reactions:

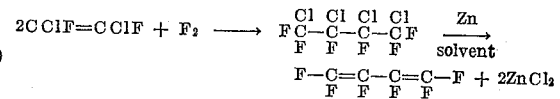

Example 4

Thirty-six grams of $SbF_3$ was added to 74 gs. redistilled $C_4Cl_8F_2$, $CFCl_2CCl_2CCl_2CFCl_2$, together with 2 ccs. of $SbCl_5$ and the mixture heated overnight on a steam bath with stirring. The following morning an oil bath was substituted for the steam bath and the reaction mixture heated for two hours at 140° C. A slight amount of reflux was noted. Two additional ccs. of $SbCl_5$ was added and heating continued at approximately 130°. After a short while refluxing increased markedly. After two hours at 130–140° C., 20 gs. $SbF_3$ was added and heating continued with no apparent increase in rate of reflux. The reaction flask was cooled and the organic layer decanted and washed twice with aqueous HCl. A yield of about 51 gs. was obtained. The product was distilled and yielded about 25 gs. of a fraction consisting essentially of $CF_2ClCCl_2CCl_2CF_2Cl$ and having the following characteristics: B. P. 125–126° C. at 76 mm. Hg; $n_D^{28}$, 1.457; chlorine content 63.4% (theoretical 63.2%).

On treatment of this fraction with zinc, $CF_2=CCl—CCl=CF_2$, B. P. 67–70° C., uncorrected, was obtained.

Example 5

The fluorination of $CFCl_2—CCl_2—CCl_2—CFCl_2$ was also carried out by means of HF and HgO. 1,4-difluorooctachlorobutane 0.54 M., HgO 1.08 M., and HF 7.5 M. were heated in a steel bomb with shaking at 100 to 110° C. for eight hours. After washing and drying the products, distillation yielded: 95.6 gs. $CF_2Cl—CCl_2—CCl_2—CF_2Cl$, B. P. 132–136° C. at 100 mm. Hg; 21.5 gs. of an intermediate fraction, B. P. 136–160° C. at 100 mm. Hg and 72 gs. $CF_2Cl—CCl_2—CCl_2—CFCl_2$, B. P. 160–165° C. at 100 mm. Hg.

Dechlorination of $CFCl_2—CCl_2—CCl_2—CF_2Cl$ with zinc in alcohol yielded $$CFCl=CCl—CCl=CF_2$$

B. P. 104.5° C. at 740 mm. and dechlorination of $CF_2Cl—CCl_2—CCl_2—CF_2Cl$ similarly yielded $$CF_2=CClCCl=CF_2$$

B. P. 66.5–67.2° C. Redistillation yielded a purer fraction B. P. 67.2° C.

By-products are formed in the fluorination of perchlorofluoroolefins with elementary fluorine and products may generally be isolated from such reactions which contain more or less fluorine than those expected by the combining of two molecules of the olefin and addition of a fluorine atom at each end. Thus, for example, in the fluorination of $CFCl=CFCl$, by-products formed included $C_4Cl_6F_4$ and $C_4Cl_5F_5$. The latter compound had the following physical properties: B. P. 90–92° C. at 78 mm. Hg; chlorine content 55.5% (theoretical 55.34%) and fluorine content 29.5% (theoretical 29.65%). Perchlorofluorobutadienes may be made from these by-products.

The compound 1,2,3,4 - tetrachlorodifluorobutadiene, $CFCl=CCl—CCl=CFCl$, is prepared by dechlorinating $CFCl_2CCl_2CCl_2CFCl_2$ with zinc in dioxane and has a chlorine content 61.4% (theoretical 62.24%) and fluorine content 17% (theoretical 16.68%). This olefin presumably was formed as a mixture of stereoisomers. Another preparation made using zinc and ethanol had a boiling point of 140.6° C., $n_D^{20}$, 1.4788; $d_4^{20}$, 1.6193.

Another isomer of formula $C_4Cl_2F_4$ having the structure $CFCl=CFCF=CFCl$ is prepared by dechlorinating $CFCl_2CFClCFClCFCl_2$ with zinc and has a chlorine content 36.4% (theoretical 36.37%) and fluorine content 39.2% (theoretical 38.99%). The $CFCl_2CFClCFClCFCl_2$, B. P. 84–86° C. at 8.5 mm. was prepared by fluorinating perchlorobutadiene-1,3 at a temperature of 0° C. and atmospheric pressure. Another sample of $CFCl=CF—CF=CFCl$ from a different dechlorination reaction had a B. P. of 82.7–83.2° C. at 740 mm.; $n_D^{20}$, 1.4053; $d_4^{20}$, 1.5616.

Using the procedures described in detail in the examples, other perhalofluorobutadienes may be prepared. For example, the following reactions may be carried out:

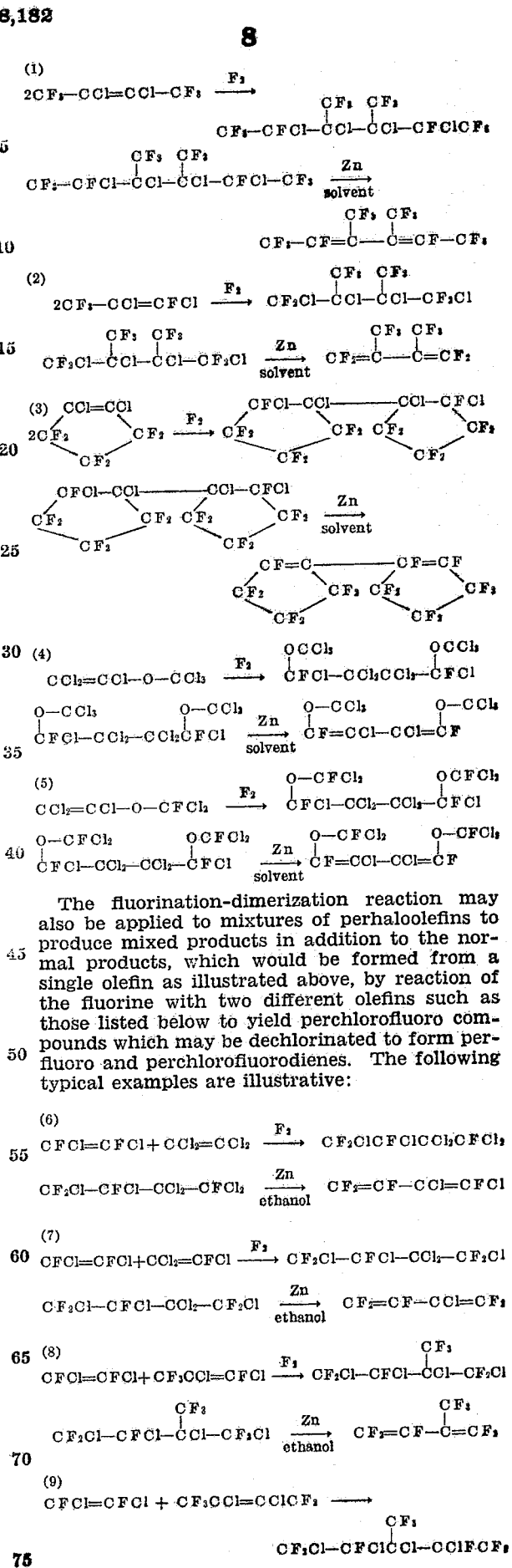

The fluorination-dimerization reaction may also be applied to mixtures of perhaloolefins to produce mixed products in addition to the normal products, which would be formed from a single olefin as illustrated above, by reaction of the fluorine with two different olefins such as those listed below to yield perchlorofluoro compounds which may be dechlorinated to form perfluoro and perchlorofluorodienes. The following typical examples are illustrative:

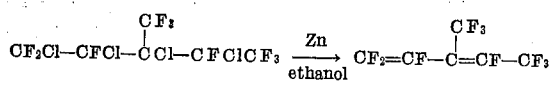

(10)

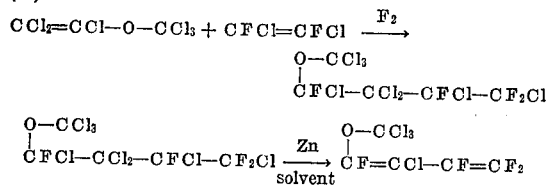

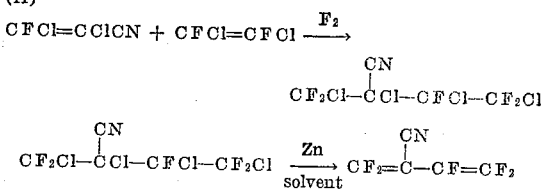

(11)

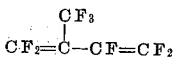

$$CF_2Cl-\underset{\underset{CN}{|}}{C}Cl-CFCl-CF_2Cl$$

$$CF_2Cl-\underset{\underset{CN}{|}}{C}Cl-CFCl-CF_2Cl \xrightarrow[solvent]{Zn} CF_2=\underset{\underset{CN}{|}}{C}-CF=CF_2$$

The dechlorination step of these reactions is suitably carried out at the reflux temperature of the alcohol at atmospheric pressure.

Perfluorochloroprene, $CF_2=CCl-CF=CF_2$, B. P. 37°; 1,2-dichlorotetrafluorobutadiene-1,3, $CFCl=CCl-CF=CF_2$, B. P. 72°; perfluoro-2-methylbutadiene-1,3, $$CF_2=\underset{\underset{CF_3}{|}}{C}-CF=CF_2$$

B. P. 39° are preferred diene compounds for use as intermediates for the preparation of polymers and the like and may be prepared by the above method. The fluorine induced dimerization which is the first step in each of the above reactions is preferably carried out at a temperature of 0° C. or below at temperatures at which reaction with fluorine proceeds at a rapid rate. Fluorobutadienes substituted by other radicals such as, for example, $-C_2F_5$, $-CF_2Cl$ and $-CFCl_2$ may also be prepared.

Perfluorohexadiene-1,5, $CF_2=CF-CF_2-CF_2-FC=CF_2$, is prepared by treatment of a perfluoroallyl halide, $CF_2=CFCF_2Z$, where Z is chosen from Cl, Br, I, with an active metal, chosen from the group of sodium, potassium, zinc or copper, in a relatively inert non-hydroxyl-containing solvent such as a hydrocarbon or an ether of convenient boiling point.

$2CF_2=CF-CF_2Z+2M \rightarrow$
$CF_2=CF-CF_2-CF_2-CF=CF_2+2MZ$ (or $MZ_2$)

Sodium is a preferred metal for use with perfluoroallyl chloride and zinc is a preferred metal for use with perfluoroallyliodide. When sodium metal is utilized the allyl halide is added at a slow rate and a large excess is not permitted to accumulate during the reaction. With zinc the presence of excess allyl halide may be permitted. The reaction is normally carried out at the boiling point of the solvent-halide mixture. Dioxane is a generally useful solvent. The desired product $CF_2=CF-CF_2-CF_2-CF=CF_2$, B. P. 60° is isolated by distillation. The preparation of this compound is illustrative of the preparation of a non-conjugated perfluorodiene.

Another non-conjugated perfluorodiene, perfluoro 1,2-divinyl cyclobutane,

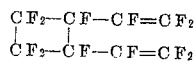

is obtained together with other isomers by heating perfluorobutadiene-1,3, $CF_2=CF-CF=CF_2$, suitably at temperatures from about 100° C. to about 200° C., experiments of this type being described in my copending application Serial No. 601,387, filed June 25, 1945.

The compound perfluoroallene, $CF_2=C=CF_2$, B. P. —28° C. is prepared by carrying out the following reaction steps:

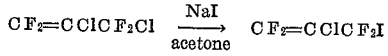

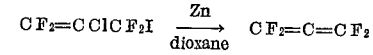

Both reaction steps are carried out at the reflux temperature of the solvent at atmospheric pressure. The product is distilled out as it is formed. This reaction illustrates the preparation of a compound having at least two double bonds, only 3 carbon atoms, and at least one fluorine atom attached to one of the carbon atoms.

The polyunsaturated fluoroolefins of the present invention, because of their unsaturation, are exceedingly versatile compounds for syntheses and for polymerizations. Thus, as disclosed in my copending application Serial No. 69,237, filed January 4, 1949, now abandoned, rubbery materials which have the added advantage of being highly resistant to many reactive substances may be prepared from hexafluorobutadiene-1,3. As disclosed in my copending application Serial No. 601,387, filed June 25, 1945, the dimers and trimers may be prepared and may be saturated with fluorine or chlorine to yield, in general, compounds useful as heat interchange liquids, lubricants, solvents, and the like, having great chemical stability. The polyunsaturated fluoroolefins of this invention may be co-polymerized with other olefins such as tetrafluoroethylene, trifluoromonochloroethylene, vinyl chloride, vinyl acetate, styrene and others to yield useful materials such as plastics. By varying the R substituents of the fluoroolefin used as the starting material in a particular synthesis, the properties of the products obtained may be varied. It is evident that the compounds of this invention constitute a very useful class and make possible the production of a great number of other new and useful fluorocompounds.

Since many embodiments might be made of the present invention and since many changes might be made in the embodiments described, it is to be understood that the foregoing description is to be interpreted as illustrative only and not in a limiting sense.

I claim:
1. Fluorobutadienes consisting of carbon and fluorine.
2. Fluorobutadienes consisting of carbon, fluorine and chlorine.
3. Butadienes having the formula $C_4F_4Cl_2$.
4. Butadienes having the formula $C_4F_3Cl_3$.
5. Hexafluorobutadiene-1,3.
6. A butadiene having the formula
$$CF_2=CCl-CCl=CF_2.$$
7. A butadiene having the formula
$$CFCl=CCl-CCl=CF_2$$
8. A butadiene having the formula
$$CFCl=CCl-CCl=CFCl$$
9. Perfluoroallene, B. P. —28° C.
10. The method of preparing a fluorobutadiene consisting of carbon and halogen which comprises providing the 1,2,3,4-tetrahalobutane corresponding to said butadiene, said four halogen atoms being selected from at least one of the group consisting of chlorine and bromine, and stripping said four halogen atoms from said butane.

11. The method of preparing hexafluorobutadiene-1,3 which comprises providing a 1,2,3,4-tetrahalohexafluorobutane in which said four halogen atoms are selected from at least one of the group consisting of chlorine and bromine, and removing said four halogen atoms from the latter compound by causing said compound to react with zinc.

12. The method of preparing hexafluorobutadiene-1,3 which comprises providing 1,2,3,4-tetrachlorohexafluorobutane, and removing chlorine from the latter compound by causing said compound to react wtih zinc.

13. The method of preparing a fluorobutadiene consisting of carbon and halogen which comprises prividing the 3,4-dihalobutene-1 corresponding to said butadiene, said two halogen atoms being selected from at least one of the group consisting of chlorine and bromine, and removing said two halogen atoms from said butene.

14. The method of preparing hexafluorobutadiene-1,3 which comprises providing 3,4-dichlorohexafluorobutene-1, and removing the chlorine from the latter compound by causing said compound to react with zinc.

15. The method of preparing a fluorobutadiene consisting of carbon and halogen which comprises heating an olefin of the formula

in which X is a halogen selected from at least one of the group consisting of chlorine and bromine, and the R substituents are selected from the group of halogen, perfluoroalkyl, perfluoroaryl, perfluorochloroalkyl and perfluorochloroaryl, at least one R substituent being fluorine, at a temperature between about 190 and about 800° C., recovering a 3,4-dihalobutene-1 compound in which the halogen in the 3,4 positions is X, and removing said latter halogen from said butene.

16. The method of preparing hexafluorobutadiene-1,3 which comprises heating trifluoromonochloroethylene at a temperature between about 400 and about 800° C., recovering 3,4-dichloroperfluorobutene-1 and dechlorinating the latter compound by causing said compound to react with zinc.

17. The method of preparing a perhalofluorobutadiene which comprises heating difluorodichloroethylene at a temperature between about 190 and about 300° C., to produce a 3,4-dichlorobutene-1 compound and dechlorinating said compound.

18. The method of preparing hexafluorobutadiene-1,3 which comprises heating trifluoromonochloroethylene at a temperature between about 400 and about 800° C., chlorinating the 3,4-dichlorobutene-1 thus produced to convert the same to 1,2,3,4-tetrachlorohexafluorobutane, separating the latter comound from the reaction products and removing chlorine from said butane by causing the same to react with zinc.

19. The method of preparing a fluorobutadiene consisting of carbon and halogen which comprises providing an at least partially halogen saturated derivative of the desired fluorobutadiene, said latter halogen being selected from at least one of the group consisting of chlorine and bromine, and removing said halogen atoms from said derivative to leave said fluorobutadiene.

20. A polyunsaturated fluoroolefin having at least three base carbon atoms and having at least two double bonds between base carbon atoms and at least one fluorine atom attached to a base carbon atom, the remaining substituents being selected from at least one of the group consisting of fluorine, chlorine and the hydrogen-free stable functional groups.

21. An acyclic polyunsaturated fluoroolefin having from 4 to 12 base carbon atoms and having at least two double bonds between base carbon atoms and at least one fluorine atom attached to a base carbon atom, the remaining substituents being selected from at least one of the group consisting of fluorine, chlorine and the hydrogen-free stable functional groups.

22. A fluorodiene having at least one fluorine atom and the remaining substituents being selected from at least one of the group consisting of fluorine, chlorine and the hydrogen-free stable functional groups.

23. A perchlorofluorodiene.

24. A fluorobutadiene containing at least one fluorine atom and the remaining substituents being selected from at least one of the group consisting of fluorine, chlorine and the hydrogen-free stable functional groups.

25. A perfluorodiene.

26. A polyfluorobutadiene consisting of carbon, fluorine and chlorine.

WILLIAM T. MILLER.

References Cited in the file of this patent

UNITED STATES PATENTS

| Number | Name | Date |
|---|---|---|
| 2,344,061 | Renoll | Mar. 14, 1944 |
| 2,426,792 | Salisbury | Sept. 2, 1947 |

FOREIGN PATENTS

| Number | Country | Date |
|---|---|---|
| 737,276 | Germany | July 9, 1943 |